United States Patent [19]

Abe et al.

[11] Patent Number: 5,187,222
[45] Date of Patent: Feb. 16, 1993

[54] PEROXIDE-VULCANIZABLE, FLUORINE-CONTAINING ELASTOMER COMPOSITION

[75] Inventors: Masatoshi Abe; Yuichi Yamamoto; Akihiro Naraki, all of Kitaibaraki, Japan

[73] Assignee: Nippon Moktron Limited, Tokyo, Japan

[21] Appl. No.: 777,192

[22] Filed: Oct. 16, 1991

Related U.S. Application Data

[63] Continuation of Ser. No. 466,490, Jan. 17, 1990, abandoned.

[30] Foreign Application Priority Data

Feb. 22, 1989 [JP] Japan .................................. 1-40166

[51] Int. Cl.$^5$ .............................................. C08K 3/34
[52] U.S. Cl. .................................... 524/492; 526/206; 525/326.4

[58] Field of Search ..................... 524/492; 525/326.4; 526/206

[56] References Cited

U.S. PATENT DOCUMENTS 4,748,223 5/1988 Haruyoshi .......................... 526/206

Primary Examiner—Joseph L. Schofer
Assistant Examiner—Peter D. Mulcahy
Attorney, Agent, or Firm—Fred Philpitt

[57] ABSTRACT

A white pigment-containing, peroxide-vulcanizable, fluorine-containing elastomer composition, which comprises a fluorine-containing elastomer containing at least one of iodine and bromine in the molecule, an organic peroxide, a polyfunctional compound and ultra fine white carbon particles having a pH of 9 to 12 as an aqueous 4~5% by weight solution gives a vulcanized product with an improved compression set.

20 Claims, No Drawings

PEROXIDE-VULCANIZABLE, FLUORINE-CONTAINING ELASTOMER COMPOSITION

This is a continuation of application Ser. No. 07/466,490, filed Jan. 17, 1990, now abandoned, and the benefits of 35 USC 120 are claimed relative to it.

BACKGROUND OF THE INVENTION

1. Field of the Invention

This invention relates to a peroxide-vulcanizable, fluorine-containing elastomer composition, and more particularly a white pigment-containing composition of peroxide-vulcanizable, fluorine-containing elastomer, with an improved compression set.

2. Description of the Prior Art

Generally, carbon black such as MT carbon black, etc. has been used as a filler for the peroxide vulcanizable, fluorine-containing elastomer, but black vulcanized products are obtained, resulting in poor discriminatability and limited use range as products. Thus, such disadvantages can be overcome by changing the filler from the carbon black to white carbon and by adding various pigments to prepare a composition colored as desired, and vulcanizing such a colored composition. However, the resulting vulcanized products generally have no better compression set as a criterion of seal characteristics in the case of sealing materials as use, when compared with black vulcanized products using carbon black such as MT carbon black, etc.

SUMMARY OF THE INVENTION

An object of the present invention is to provide a white pigment-containing composition of peroxide-vulcanizable, fluorine-containing elastomer without any deterioration of compression set.

DETAILED DESCRIPTION OF THE PREFERRED EMBODIMENTS

The object of the present invention can be attained with a peroxide-vulcanizable, fluorine-containing elastomer composition which comprises a fluorine-containing elastomer containing at least one of iodine and bromine in the molecule, an organic peroxide, a polyfunctional compound and ultra fine white carbon particles having a pH of 9-12 as an aqueous 4~5% by weight solution.

A peroxide-vulcanizable, fluorine-containing elastomer composition comprising a fluorine-containing elastomer containing at least one of iodine and bromine in the molecule, an organic peroxide, a polyfunctional compound and a filler has been already known. For example, Japanese Patent Application Kokai (Laid-open) No. 63-308,008 filed by the same applicant discloses that carbon black, silica, clay, talc, diatomaceous earth, barium sulfate, etc. can be contained in the composition.

However, in the case of silica, most of silica so far generally used have a pH of about 5 to 6 as the aqueous 4~5% by weight solution, and silica having a pH of 9 to 12 as the aqueous 4~5% by weight solution are also commercially available, but are directed to special uses, and not to the general uses. In the prevent invention, the deterioration of compression set can be effectively prevented even in the white pigment-containing composition by selectively using ultra fine white carbon particles having a specific pH as the aqueous solution (9-12, preferably 10-11).

These fluorine-containing olefins can be also copolymerized with at least one of olefinic compound having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkyl vinyl ethers such as methyl vinyl ether, ethyl vinyl ether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl vinyl ether, etc. It is preferable that the fluorine-containing diene is copolymerized in a proportion of not more than 1% by mole, as contained in the fluorine-containing elastomer. When copolymerized in a proportion above about 1% by mole, the copolymer elastomer undergoes considerable gelation, deteriorating the processability(flow characteristics) and the elongation of the vulcanized products.

Specific fluorine-containing olefin copolymers include, for example, hexafluoropropene-vinylidene fluoride copolymer, hexafluoropropene-vinylidene fluoride-tetrafluoroethylene terpolymer, tetrafluoroethylene-vinylidene fluoride-perfluoro-(methyl vinyl ether) terpolymer, tetrafluoroethylene-vinylidene fluoride-perfluoro(propyl vinyl ether) terpolymer, tetrafluoroethylene-perfluoro(propoxypropyl vinyl ether) copolymer, tetrafluoroethylene-perfluoro(methyl vinyl ether) copolymer, tetrafluoroethylene-propylene copolymer, tetrafluoroethylene-vinylidene fluoride-hexafluoropropene-pentafluoropropene quaternary copolymer, tetrafluoroethylene-hexafluoropropene-vinylidene fluoride-perfluoro(methyl vinyl ether) quaternary copolymer, tetrafluoroethylene-hexafluoropropene-hexafluoroisobutene terpolymer, tetrafluoroethylene-cyclohexyl vinyl ether copolymer, hexafluoropropene-vinylidene fluoride-chlorotrifluoroethylene terpolymer, vinylidene fluoride-tetrafluoroethylene-methyl perfluorovinyl ether terpolymer, vinylidene fluoride-tetrafluoroethylene-n-butyl perfluorovinyl ether terpolymer, vinylidene fluoride-methyl perfluorovinyl ether-perfluoro-(methyl vinyl ether) terpolymer, tetrafluoroethylene-methyl perfluorovinyl ether-perfluoro(methyl vinyl ether) terpolymer, vinylidene fluoride-hexafluoropropene-tetrafluoroethylene-methyl perfluorovinyl ether quaternary copolymer, tetrafluoroethylene-n-butyl perfluorovinyl ether-perfluoro-(methyl vinyl ether) terpolymer, vinylidene fluoride-n-butyl perfluorovinyl ether copolymer, tetrafluoroethylene-propylene-n-butyl perfluorovinyl ether terpolymer, tetrafluoroethylene-vinylidene fluoride-propylene-n-butyl perfluorovinyl ether quaternary copolymer, etc.

Polymerization reaction of fluorine-containing olefins or fluorine-containing olefins with the comonomers above mentioned is carried out by a so far well known method, for example, solution polymerization, suspension polymerization or emulsion polymerization.

When the polymerization reaction is carried out in the presence of an iodine and bromine-containing compound, an iodine-containing compound or a bromine-containing compound, iodine and/or bromine is introduced into the fluorine-containing olefin copolymers to form crosslinking points for the organic peroxide crosslinking.

The iodine and bromine-containing compound is saturated or unsaturated linear or aromatic compounds represented by the general formula:

$$RBr_nI_m$$

wherein R is a fluorohydrocarbon group, chlorofluoro hydrocarbon group, chlorohydrocarbon group or hydrocarbon group and n and m are 1 or 2 and preferably n and m are each 1. The linear iodine and bromine-containing compound for use in the present invention includes, for example, 1-bromo-2-iodoperfluoroethane, 1-bromo-3-iodoperfluoropropane, 1-bromo-4-iodoperfluorobutane, 2-bromo-3-iodoperfluorobutane, 3,4-dibromo-1-iodo-1,1,2,2,4,4-hexafluorobutane, 3-bromo-4-iodoperfluorobutene-1, 2-bromo-4-iodoperfluorobutene-1, etc. The aromatic iodine and bromine-containing compound for use in the present invention includes, for example, monoiodomonobromo-substituted benzenes, diiodomonobromo-substituted benzenes, monoiododibromo-substituted benzenes, (2-iodoethyl) and (2-bromoethyl)-substituted benzenes, etc. at various substitution positions. These iodine and bromine-containing compounds generally combine with the fluorine-containing olefin copolymers at the molecule terminals to give fluorine-containing elastomers capable of efficiently making the crosslinking. To this end, about 0.001 to about 5% by weight, preferably about 0.01 to about 3% by weight, of the iodine and bromine-containing compound in terms of iodine and bromine is made to combine with the fluorine-containing olefin copolymers.

As the iodine-containing compound, aromatic compounds or perfluoroaromatic compounds polysubstituted with iodine atoms or iodoalkyl groups, for example, iodoethyl group, are used in a combining ratio of about 0.001 to about 5% by weight, preferably about 0.001 to about 3% by weight, in terms of the iodine in the fluorine-containing elastomer or iodo-substituted, saturated or unsaturated aliphatic hydrocarbons, fluoroaliphatic hydrocarbons or chlorofluoroaliphatic hydrocarbons are used in a combining ratio of about 0.001 to about 10% by weight in terms of the iodine in the fluorine-containing elastomer.

As the bromine-containing compound, aromatic compounds or perfluoroaromatic compounds polysubstituted with bromine atoms or bromoalkyl groups, for example, bromoethyl group, are used in a combining ratio of about 0.001 to about 5% by weight, preferably about 0.01 to about 3% by weight, in terms of the bromine in the fluorine-containing elastomer, or bromine-substituted saturated aliphatic hydrocarbons are used in a combining ratio of about 0.001 to about 10% by weight in terms of the bromine in the fluorine-containing elastomer, or bromine-containing olefins are used in a combining ratio of about 0.05% by weight or more, generally about 0.3 to about 1.5% by weight, in terms of the bromine in the fluorine-containing elastomer. Furthermore, 3- or 2-bromoperfluoropropyl perfluorovinyl ether, etc. can be also used.

As the polyfunctional compound, about 0.1 to about 20 parts by weight, preferably about 0.5 to about 10 parts by weight, of polyfunctional compounds capable of improving the mechanical strength, compression set, etc. such as tri(metha)allyl isocyanurate, tri(metha)allyl cyanurate, triallyl trimellitate, N,N'-m-phenylene bis-maleimide, diallyl phthalate, tris(diallylamine)-s-triazine, triallyl phosphite, (di)ethyleneglycol diacrylate, neopentylglycol diacrylate, etc. are used per 100 parts by weight of the fluorine-containing elastomer.

As the ultra fine white carbon particles having a pH of 9 to 12 as the aqueous 4~5% by weight solution, about 0.5 to about 100 parts by weight, preferably about 1 to about 30 parts by weight, of various commercially available white ultra fine particles such as silicic anhydride or hydrated silicic acid, for example, Nipseal NA (pH 10-11) made by Nippon Silica K.K., Japan, Carplex 1120 (pH 10.4-10.9) and Carplex 100 (pH 10.1-10.6) made by Shionogi Seiyaku K.K., Japan, are used per 100 parts by weight of the fluorine-containing elastomer.

The present composition can be prepared by mixing the afore-mentioned components and other necessary agents such as a coloring agent, etc. by any mixing means such as roll mixing, kneader mixing, Bambury mixing, solution mixing, etc.

The cross-linking of the thus prepared composition is carried out by primary cross-linking by press vulcanization at a temperature of about 100° to about 250° C. for about 1 to about 120 minutes in view of one-minute half-temperature of organic peroxide as used and then by secondary cross-linking in an oven at a temperature of about 150° to about 300° C. for 0 to 30 hours.

The present fluorine-containing elastomer composition is white to milky white and can be colored to any desired color by adding various pigments thereto. Furthermore, the present composition has largely improved vulcanization speed and compression set, as compared with composition containing ultra fine white carbon particles having a pH lower than 9 as the aqueous 4~5% by weight solution.

Thus, the vulcanized products of the present composition can be effectively used, for example, in sealing materials such as oil seals, packings, gaskets, or O-rings, diaphragms, hose linings, etc.

The present invention will be described in detail below with reference to Examples.

REFERENCE EXAMPLE 1

960 ml of deionized water, 1.8 g of 1-bromo-2-iodoperfluoroethane, 4.2 g of ammonium perfluorooctanoate, 4.2 g of hydrogen disodium phosphate, 0.075 g of sodium hydroxide, 4.8 g of ammonium persulfate and 0.3 g of acid sodium sulfite were added to an autoclave having a net capacity of 3 l, and then 480 g of perfluoro(methyl vinyl) ether and 192 g of tetrafluoroethylene were charged thereto.

The mixture was subjected to copolymerization reaction at a reaction temperature of 50° C. for 24 hours, and then the unreacted gas was purged from the autoclave to discontinue the reaction. Then, an aqueous 5% by weight potassium alum solution was added to the thus obtained aqueous emulsion to coagulate the formed polymers, followed by water washing and drying, and 410 g of rubbery copolymers in a molar ratio of two components of 52/48 with $[\eta]=0.4$ (in Fluorinat FC-77, product of Sumitomo 3-M K.K., Japan, at 35° C.) were obtained.

REFERENCE EXAMPLE 2

1,500 ml of deionized water and 7.5 g of ammonium perfluorooctanoate were charged into an autoclave having a net capacity of 3 liters, and the inside space of the autoclave was thoroughly flushed with a gas mixture of vinylidene fluoride/hexafluoropropene/tetrafluoroethylene in a ratio by mole of 42/38/20. Then, the inside pressure was increased to 12 kg/cm$^2$ gauge with this gas mixture, and then 4.0 g of 1-bromo-2-iodoperfluoroethane was injected therein. The inside temperature was increased to 80° C. with stirring, where the inside pressure reached 16 kg/cm$^2$ gauge.

Then, 0.5 g of ammonium persulfate dissolved in 20 ml of deionized water was added thereto to initiate the polymerization reaction. Since the inside pressure was decreased as the reaction advanced, and when the inside pressure was lowered down to 15 kg/cm$^2$ gauge, it was again increased to 16 kg/cm$^2$ gauge with a gas mixture of vinylidene fluoride/hexafluoropropene/tetrafluoroethylene in a ratio by mole of 58/20/22. The polymerization was likewise continued under a pressure between 15 and 16 kg/cm$^2$ gauge, and 24 hours thereafter, the unreacted gas mixture was purged from the autoclave to discontinue the polymerization reaction.

Then, an aqueous 5 wt. % potassium alum solution was added to the thus obtained aqueous emulsion to coagulate the formed polymers, followed by water washing and drying, and 468 g of rubbery terpolymer in a molar ratio of three components of 58/25/17 with [η]=0.68 (in acetone, 35° C.) were obtained.

EXAMPLES 1 TO 5 AND COMPARATIVE EXAMPLES 1 TO 5

100 parts by weight of the fluorine-containing elastomer containing iodine and bromine, obtained in Reference Example 1, 3.5 parts by weight of triallyl isocyanurate (concentration: 60%), 2.0 parts by weight of 2,5-dimethyl-2,5-di(t-butylperoxy)hexane (concentration: 40%) and a predetermined amount of various fillers were roll mixed, and the thus prepared fluorine-containing elastomer compositions were vulcanization molded into sheets and P-24 O-rings by primary vulcanization at 180° C. for 10 minutes and to secondary vulcanization at 200° C. for 22 hours.

| Example | Filler | pH | Mixing amount (parts by wt.) |
|---|---|---|---|
| Example 1 | Nipseal NA | 10.5 | 5 |
| Example 2 | Nipseal NA | " | 10 |
| Example 3 | Carplex 1120 | 10.4 | 5 |
| Example 4 | Carplex 1120 | " | 10 |
| Example 5 | Carplex 1120 | " | 15 |
| Comp. Ex. 1 | MT carbon black | 8.3 | 15 |
| Comp. Ex. 2 | Carplex 67 | 7.5 | 5 |
| Comp. Ex. 3 | Carplex 67 | 7.5 | 10 |
| Comp. Ex. 4 | Aerosil 972 | 3.8 | 5 |
| Comp. Ex. 5 | Aerosil 972 | 3.8 | 5 |

The thus obtained sheets were subjected to measurement of physical properties in the normal state and the thus obtained O-rings were subjected to measurement of compression set (25% compression at 200° C. for 70 hours). The results are shown in the following Table 1.

TABLE 1

| Measurement item | Example 1 | 2 | 3 | 4 | 5 | Comp. Ex. 1 | 2 | 3 | 4 | 5 |
|---|---|---|---|---|---|---|---|---|---|---|
| Hardness (JIS-A) | 75 | 81 | 76 | 83 | 89 | 79 | 76 | 83 | 76 | 82 |
| 100% modulus (kg/cm$^2$) | 58 | 93 | 62 | 102 | 139 | 85 | 63 | 98 | 65 | 92 |
| Tensile strength (kg/cm$^2$) | 185 | 200 | 206 | 226 | 215 | 187 | 227 | 230 | 207 | 212 |
| Elongation (%) | 212 | 192 | 206 | 186 | 161 | 198 | 211 | 172 | 212 | 190 |
| Compression set (%) | 22 | 25 | 23 | 26 | 26 | 23 | 32 | 39 | 35 | 43 |

EXAMPLES 6 TO 9 AND COMPARATIVE EXAMPLES 6 TO 8

100 parts by weight of the fluorine-containing elastomer containing iodine and bromine, obtained in Reference Example 2, 10 parts by weight of triallyl isocyanurate (concentration: 60%), 4 parts by weight of 2,5-dimethyl-2,5-di(t-butylperoxy)hexane (concentration: 40%) and a predetermined amount of various fillers were used to prepare fluorine-containing elastomers and vulcanization molding sheets and O-rings from the elastomers in the same manner as in Example 1.

| Example | Filler | pH | Mixing amount (parts by wt.) |
|---|---|---|---|
| Example 6 | Nipseal NA | 10.5 | 5 |
| Example 7 | Nipseal NA | " | 10 |
| Example 8 | Carplex 1120 | 10.4 | 5 |
| Example 9 | Carplex 1120 | " | 10 |
| Comp. Ex. 6 | MT carbon black | 8.3 | 20 |
| Comp. Ex. 7 | Carplex 67 | 7.5 | 5 |
| Comp. Ex. 8 | Aerosil 972 | 3.8 | 5 |

The thus vulcanization molded sheets were subjected to measurement of physical properties in the normal state and the O-rings were subjected to measurement of compression set. The results are shown in the following Table 2.

TABLE 2

| Measurement item | Example 6 | 7 | 8 | 9 | Comp. Ex. 6 | 7 | 8 |
|---|---|---|---|---|---|---|---|
| Hardness (JIS-A) | 67 | 73 | 68 | 73 | 72 | 68 | 69 |
| 100% modulus (kg/cm$^2$) | 41 | 63 | 45 | 70 | 44 | 48 | 52 |
| Tensile strength (kg/cm$^2$) | 195 | 221 | 200 | 218 | 202 | 210 | 208 |
| Elongation (%) | 273 | 213 | 265 | 218 | 269 | 221 | 218 |
| Compression set (%) | 37 | 40 | 35 | 37 | 35 | 45 | 51 |

EXAMPLES 10 TO 13 AND COMPARATIVE EXAMPLES 9 TO 11

100 parts by weight of the fluorine-containing elastomer containing bromine (Viton GF, product of Dupont), 7 parts by weight of triallyl isocyanurate (concentration: 60%), 2,5-dimethyl-2,5-di(t-butylperoxy)-hexane (concentration: 40%) and a predetermined amount of various fillers were used to prepare fluorine-containing elastomers and vulcanization molding sheets and O-rings in the same manner as in Example 1.

| Example | Filler | pH | Mixing amount (parts by wt.) |
|---|---|---|---|
| Example 10 | Nipseal NA | 10.5 | 5 |
| Example 11 | Nipseal NA | " | 10 |
| Example 12 | Carplex 1120 | 10.4 | 5 |
| Example 13 | Carplex 1120 | " | 10 |
| Comp. Ex. 9 | MT carbon black | 8.3 | 20 |
| Comp. Ex. 10 | Carplex 67 | 7.5 | 5 |
| Comp. Ex. 11 | Aerosil 972 | 3.8 | 5 |

The thus vulcanization molded sheets were subjected to measurement of physical properties in the normal state and the O-rings were subjected to measurement of compression set. The results are shown in the following Table 3.

TABLE 3

| Measurement item | Example | | | | Comp. Ex. | | |
|---|---|---|---|---|---|---|---|
| | 10 | 11 | 12 | 13 | 9 | 10 | 11 |
| Hardness (JIS-A) | 77 | 78 | 77 | 79 | 79 | 76 | 77 |
| 100% modulus (kg/cm$^2$) | 81 | 102 | 87 | 108 | 85 | 87 | 92 |
| Tensile strength (kg/cm$^2$) | 192 | 205 | 200 | 212 | 187 | 197 | 202 |
| Elongation (%) | 175 | 170 | 164 | 167 | 182 | 174 | 171 |
| Compression set (%) | 34 | 37 | 33 | 35 | 35 | 42 | 47 |

What is claimed is:

1. A peroxide-vulcanizable, fluorine-containing elastomer composition, which comprises a fluorine-containing elastomer containing at least one of iodine and bromine in the molecule, an organic peroxide, a polyfunctional compound and ultra fine white silicic anhydride or hydrated silicic acid particles having a pH of 9 to 12 as an aqueous 4–5% by weight solution.

2. A peroxide-vulcanizable, fluorine-containing elastomer composition according to claim 1, wherein the fluorine-containing elastomer containing at least one of iodine and bromine in the molecule is a fluorine-containing olefin copolymer obtained by polymerization reaction of fluorine-containing olefins in the presence of a saturated or unsaturated, linear or aromatic compound represented by the general formula RBr$_n$I$_m$, wherein R is a fluorohydrocarbon group, a chlorofluorohydrocarbon group, a chlorohydrocarbon group or a hydrocarbon group and n and m are 1 or 2.

3. A peroxide-vulcanizable, fluorine-containing elastomer composition according to claim 1, wherein the fluorine-containing elastomer containing iodine in the molecule is a fluorine-containing olefin copolymer obtained by polymerization reaction of fluorine-containing olefins in the presence of an iodine-substituted aromatic compound, perfluoroaromatic compound, or saturated or unsaturated aliphatic hydrocarbon, fluoroaliphatic hydrocarbon or chlorofluoroaliphatic hydrocarbon.

4. A peroxide-vulcanizable, fluorine-containing elastomer composition according to claim 1, wherein the fluorine-containing elastomer containing bromine in the molecule is a fluorine-containing olefin copolymer obtained by polymerization reaction of olefin-containing olefins in the presence of a bromine-substituted aromatic compound, perfluoroaromatic compound, or saturated or unsaturated aliphatic hydrocarbon.

5. A peroxide-vulcanizable, fluorine-containing elastomer composition according to claim 2 wherein the fluorine-containing elastomer containing at least one of iodine and bromine is contained at least one of iodine and bromine in a combining ratio of 0.001 to 10% by weight.

6. A peroxide-vulcanizable, fluorine-containing elastomer composition according to claim 3 wherein the fluorine-containing elastomer containing at least one of iodine and bromine is contained at least one of iodine and bromine in a combining ratio of 0.001 to 10% by weight.

7. A peroxide-vulcanizable, fluorine-containing elastomer composition according to claim 4 wherein the fluorine-containing elastomer containing at least one of iodine and bromine is contained at least one of iodine and bromine in a combining ratio of 0.001 to 10% by weight.

8. A peroxide-vulcanizable, fluorine-containing elastomer composition according to claim 1 wherein 0.1 to 10 parts by weight of the organic peroxide is contained per 100 parts by weight of the fluorine-containing elastomer containing at least one of iodine and bromine.

9. A peroxide-vulcanizable, fluorine-containing elastomer composition according to claim 1 wherein 0.1 to 20 parts by weight of the polyfunctional compound is contained per 100 parts by weight of the fluorine-containing elastomer containing at least one of iodine and bromine.

10. A peroxide-vulcanizable, fluorine-containing elastomer composition according to claim 1 wherein 0.5 to 100 parts by weight of the ultra fine white silicic anhydride or hydrated silica acid particles is contained per 100 parts by weight of the fluorine-containing elastomer containing at least one of iodine and bromine.

11. The composition according to claim 1 wherein the pH of said particles is 10.4–10.5.

12. The composition according to claim 2 wherein the pH of said particles is 10.4–10.5.

13. The composition according to claim 3 wherein the pH of said particles is 10.4–10.5.

14. The composition according to claim 4 wherein the pH of said particles is 10.4–10.5.

15. The composition according to claim 5 wherein the pH of said particles is 10.4–10.5.

16. The composition according to claim 6 wherein the pH of said particles is 10.4–10.5.

17. The composition according to claim 7 wherein the pH of said particles is 10.4–10.5.

18. The composition according to claim 8 wherein the pH of said particles is 10.4–10.5.

19. The composition according to claim 9 wherein the pH of said particles is 10.4–10.5.

20. The composition according to claim 10 wherein the pH of said particles is 10.4–10.5.

* * * * *